United States Patent [19]
Hirai et al.

[11] Patent Number: 5,577,577
[45] Date of Patent: Nov. 26, 1996

[54] FLOATING CALIPER TYPE DISC BRAKE HAVING NOISE REDUCING TORQUE CARRYING STRUCTURE

[75] Inventors: Minoru Hirai; Takashi Shinomiya, both of Itami, Japan

[73] Assignee: Sumitomo Electric Industries, Ltd., Osaka, Japan

[21] Appl. No.: 551,843

[22] Filed: Nov. 7, 1995

[30] Foreign Application Priority Data

Nov. 7, 1994 [JP] Japan ................................. 6-272291

[51] Int. Cl.⁶ ........................................................ F16D 65/40
[52] U.S. Cl. ............................................ 188/73.36; 188/73.38
[58] Field of Search ............................. 188/73.35, 73.36, 188/73.37, 73.38, 73.39, 73.44, 73.45, 73.46

[56] References Cited

U.S. PATENT DOCUMENTS

| | | | |
|---|---|---|---|
| 3,357,524 | 12/1967 | Smith | 188/73.39 X |
| 3,920,104 | 11/1975 | Hoffmann | |
| 3,972,393 | 8/1976 | Courbet et al. | |
| 3,990,545 | 11/1976 | Hoffmann et al. | |
| 4,068,743 | 1/1978 | Karasudani et al. | 188/73.39 X |
| 4,424,886 | 1/1984 | Frigger et al. | 188/73.39 X |
| 4,915,198 | 4/1990 | Hirashita | 188/73.39 |

FOREIGN PATENT DOCUMENTS

| | | |
|---|---|---|
| 0002399 | 6/1979 | European Pat. Off. |
| 2149872 | 3/1973 | France . |
| 2206457 | 7/1974 | France . |
| 2451604 | 5/1975 | Germany . |
| 57-167538 | 10/1982 | Japan . |
| 58-146729 | 9/1983 | Japan .................................. 188/73.38 |
| 2017236 | 10/1979 | United Kingdom . |
| 2172068 | 9/1986 | United Kingdom ................ 188/73.38 |

Primary Examiner—Lee W. Young
Attorney, Agent, or Firm—Wenderoth, Lind & Ponack

[57] ABSTRACT

A disc brake that is less likely to squeak during braking. A guide portion on a torque member has a point at which the force counteracting the braking force is produced. This point is disposed nearer to a line pass through the center of the disc than is a parallel line passing the center of the brake cylinder and extending tangentially to a circle concentric with the disc. Thus, due to the tangential force produced during braking, angular moment is produced in the same direction as the angular moment produced due to the braking force. The sum of these two angular moments act to restrain the rotation of the pads. The movement of the pads are thus strongly restrained, so that they are less likely to vibrate. Thus, it is possible to prevent squeaking of the brake resulting from vibrations of the pads.

4 Claims, 3 Drawing Sheets

FLOATING CALIPER TYPE DISC BRAKE HAVING NOISE REDUCING TORQUE CARRYING STRUCTURE

BACKGROUND OF THE INVENTION

The present invention relates to a disc brake having an improved torque-carrying structure which can suppress squeaks during braking.

A conventional disc brake has a pair of pads, which are to be brought into frictional contact with the brake disc, mounted between guide portions provided opposite to each other on the torque member or caliper so as to be slidable in the axial direction of the disc. The guide portions have guide grooves or protrusions in or on which the backing plates of the pads engage to unrotatably hold the pads and to carry braking force applied from the pads on their torque-carrying surfaces. The guide portion has a point at which a force reacting or counteracting the braking force applied from the pads is produced. On the conventional disk brake, this point is disposed on the line passing the center of the brake cylinder for biasing the pads and extending tangentially of the disc, or on the opposite side of the above line relative to the center of the disc.

In this arrangement, as shown in FIG. 3A, braking forces Fa and Fb that act on two points of the pads at the leading and trailing sides have Y-components Fay and Fby in opposite directions. The components Fay and Fby produce a moment M1 that tends to rotate the pads 1 counterclockwise in the figure.

Since the pads 1 are inclined counterclockwise relative to the torque member 2, a reactive force is produced at the point where the pads 1 engage the guide portion at the trailing side of the disc, i.e. point A at the outermost end of a torque-carrying surface 3a (see FIG. 3B).

On the other hand, the tangential components (or tangential forces) Fax and Fbx of the forces Fa and Fb have a center that coincides with the center of biasing force, that is, the center O of the brake brake cylinder 4. Since the point A at which the reactive force is produced is located nearer to the outer circumference of the disc than is the center O of the brake cylinder, a moment M2 is produced that tends to rotate the pads clockwise. Thus, the sum of the moments M1 and M2 acting on the pads tend to be small because they negate each other. In this prior art arrangement, the pads tend to vibrate during braking because it is impossible to restrain the movement of the pads with a sufficiently strong force.

In an arrangement in which the point A at which the reactive force is produced is on the line passing the point O and extending tangentially relative to a circle concentric with the disc, the moment M2 is not produced because the length of its moment arm is zero. Thus, only the moment M1 acts to restrict the movement of the pads, which is not sufficient to restrain them, so that it is impossible to prevent vibration of the pads.

Squeaks of a disc brake are the result of resonance of the entire brake, which occurs if the pads vibrate due to fluctuating torque resulting e.g. from stick slip. Thus, in order to prevent squeaks of a disc brake, the pads have to be mounted rigidly so that they do not vibrate.

Unexamined Japanese Utility Model Publication 56-7129 discloses a technique for producing moment in a reverse direction that is greater than the moment in the normal direction. In this arrangement, since the two moments, which are opposite in direction, negate each other, it is impossible to restrain the pads with a sufficiently strong force.

An object of the present invention is to provide a disc brake having a means for restraining the pads strongly during braking, and thereby reducing squeaking of the brake.

SUMMARY OF THE INVENTION

According to the present invention, there is provided a disc brake wherein one of the guide portions has a point at which a force that counteracts the braking force transmitted from the pads is produced. The point is disposed nearer to a line passing the center of the disc than is a line passing the center of the brake cylinder and extending tangentially to a circle concentric with the disc.

Preferably, this disc brake further comprises first liners having resilient arms and provided between backing plates of the pads and the guide portion at the trailing end of the pads, and second liners having resilient arms and provided between the backing plates and the guide portion provided at the leading end of the pads, the first liners and the second liners having the resilient arms positioned so as to bias the pads radially inwardly of the pads and radially outwardly of the disc, respectively.

With this arrangement, the moment M2 produced due to diametrical displacement of the center of tangential forces from the point at which the reaction force is produced coincides in direction with the moment M1 in the normal direction that is produced due to the components Fay and Fby shown in FIG. 3A. Thus, the sum of the moments M1 and M2 act to restrict the movement of the pads at the point at which the pads engage, so that the pads are restrained more strongly than in conventional arrangements. The pads are thus less likely to vibrate, so that the brake squeaks little.

Some conventional disc brakes have lock-preventive or protection liners provided with resilient arms to bias the pads toward the outer circumference of the disc. In this arrangement, if a large force that is opposite in direction to the biasing force of the resilient arms acts on the pads, the arms may yield to this force, allowing the pads to be moved by this force.

In contrast, the resilient arms on the liners in the present invention bias the leading and trailing ends of the pads in mutually opposite directions so that an angular moment is produced in the same direction as the moment M1 in the normal direction. Thus, the pads can be restrained in a predetermined position more strongly during braking. This prevents rattling of the brake while the car is traveling. Since the movement of the pads is strongly restrained at the beginning of braking, it is possible to prevent squeaks of the brake more effectively.

Other features and objects of the present invention will become apparent from the following description made with reference to the accompanying drawings, in which:

DETAILED DESCRIPTION OF THE PREFERRED EMBODIMENT

Figure 1A:
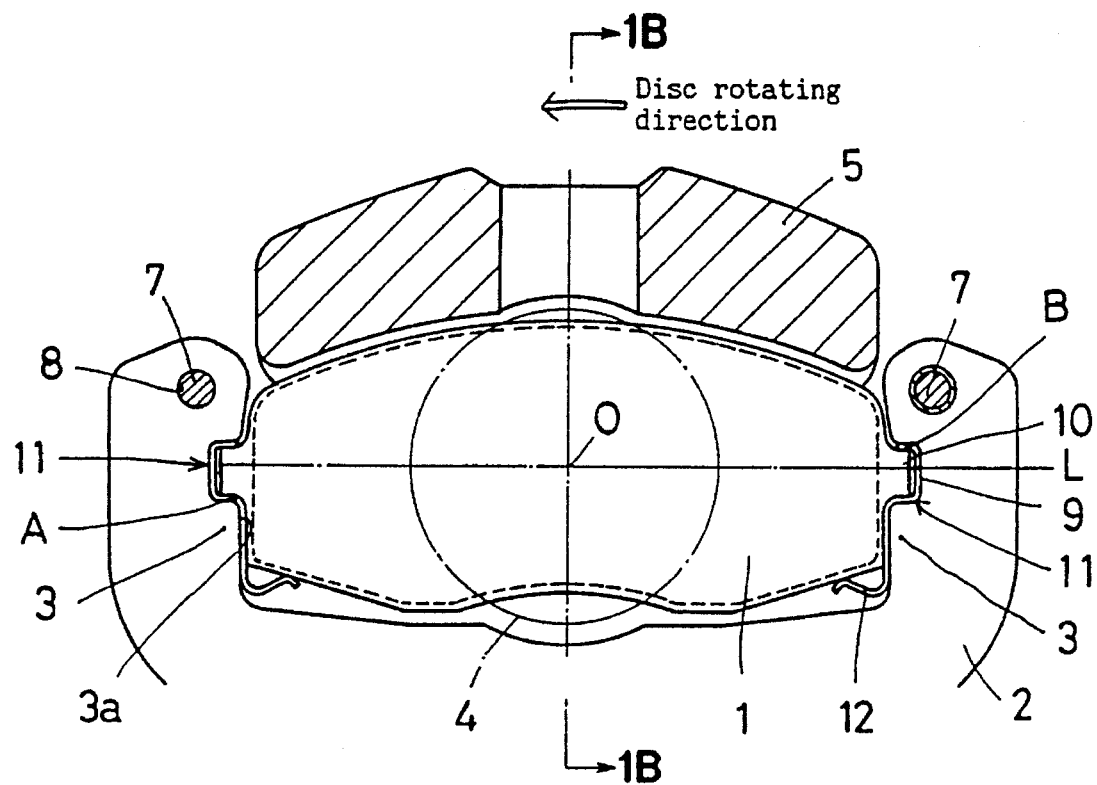
FIG. 1A is a view of a disc brake according to the present invention, the caliper being shown with its inner side cut away.

FIG. 1 shows a disc brake of one embodiment according to the present invention.

It comprises pads 1, a torque member 2 having guide portions 3 provided opposite to each other in the tangential direction of the disc, a caliper 5, a brake cylinder 4 defined in the caliper 5 and integral with the caliper 5, a brake piston 6 mounted in the cylinder 4, and slide pins 7 having one end thereof fixed to the caliper 5.

The slide pins 7 loosely fit in guide holes 8 formed in the torque member 2 to support the caliper 5 so that the caliper 5 can slide in the axial direction of the disc.

Figure 1B:
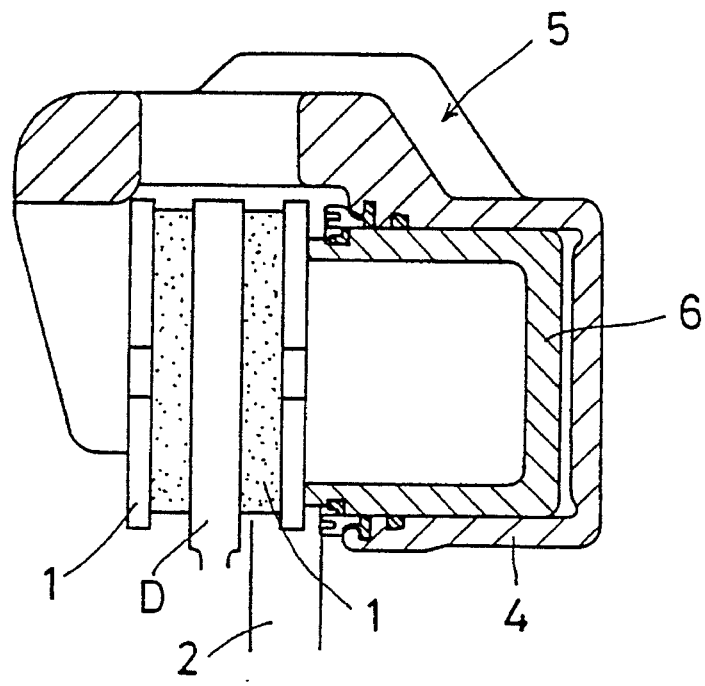
FIG. 1B is a sectional view taken along line b—b of FIG. 1A.

The pads 1 are provided opposite to each other on both sides of the disc D (FIG. 1B). They have lobes 10 at both ends which engage in guide grooves 9 formed in the guide portions 3 of the torque member so as to extend axially of the disc. The pads are thus supported so as to be slidable axially of the disc.

As is well-known in the art, in a floating caliper type disc brake such as shown in this invention, the inner pad 1 is brought into frictional contact with the disc D, biased by the brake piston 6, while the outer pad is brought into frictional contact with the disc, biased by outer jaws of the caliper 5, which slide inward by under reactive force.

In the arrangement of the present invention, as shown in FIG. 1A, the outermost end of a torque-carrying surface 3a on the guide portion 3, that is, the point A at which a force that counteracts the braking force is produced, is disposed nearer to a line passing through the center of the disc than is a parallel line L passing the center of the brake cylinder 4 and extending tangentially to a circle concentric with the disc. Thus, the aforementioned moments M1 and M2 act on the pads 1 in the same direction. This means that the sum of the moments M1 and M2 act on points A and B. The pads 1, being bound or held by a strong force which is the sum of the moments, are less likely to vibrate.

As shown in FIG. 1A, liners 11 are attached to the guide portions 3. The liners 11 have a resilient arm 12 which biases the pad at its leading and trailing ends radially outwardly of the disc to eliminate play or gaps between the pads and the guide grooves, thereby preventing rattling while the vehicle is moving.

Figure 2:
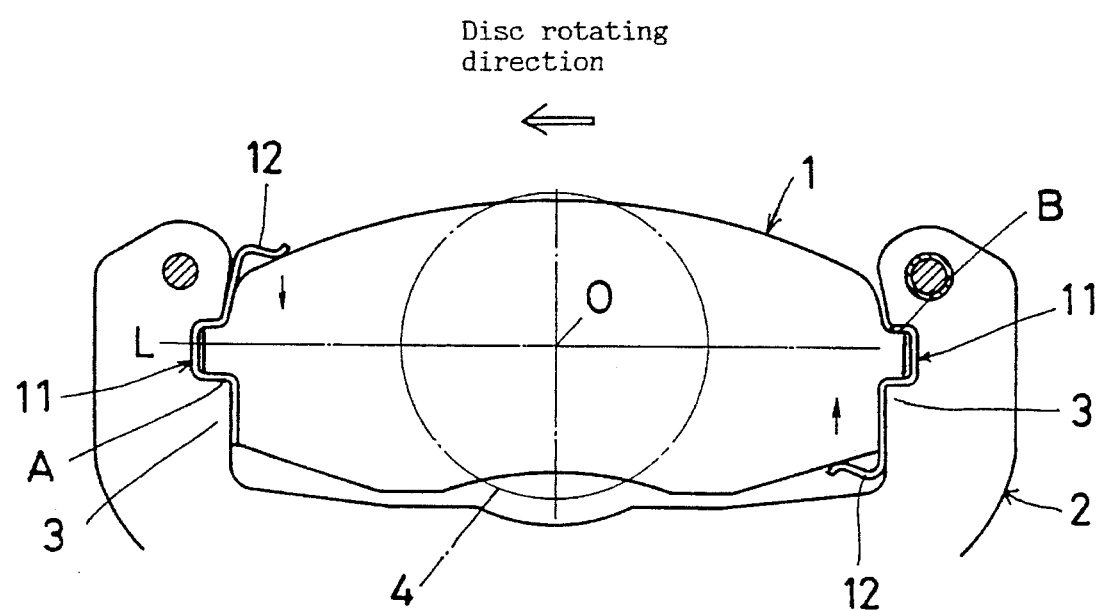
FIG. 2 is a view of another embodiment, with the caliper removed.
Figure 3A:
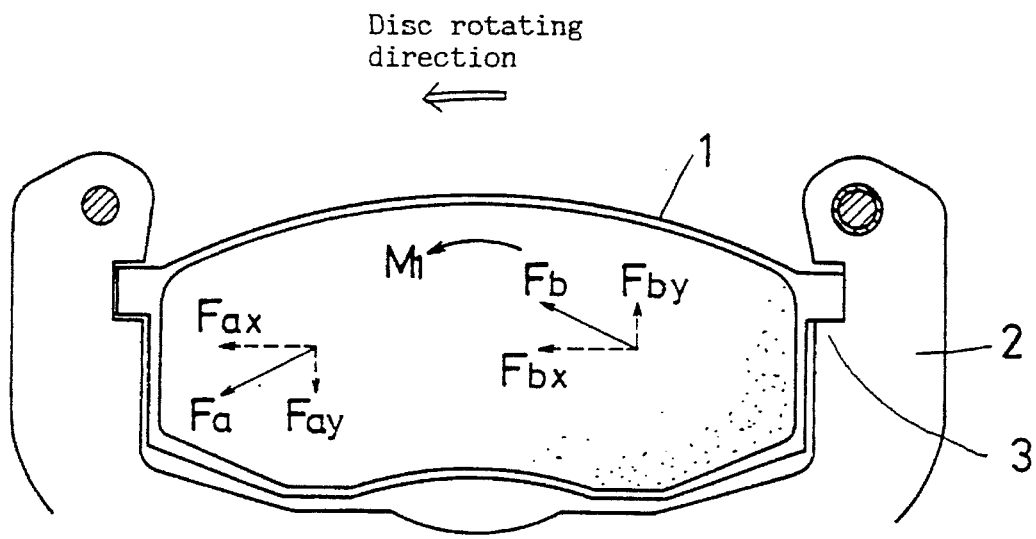
FIG. 3A is a view showing angular moments that act on the pads during braking.
Figure 3B:
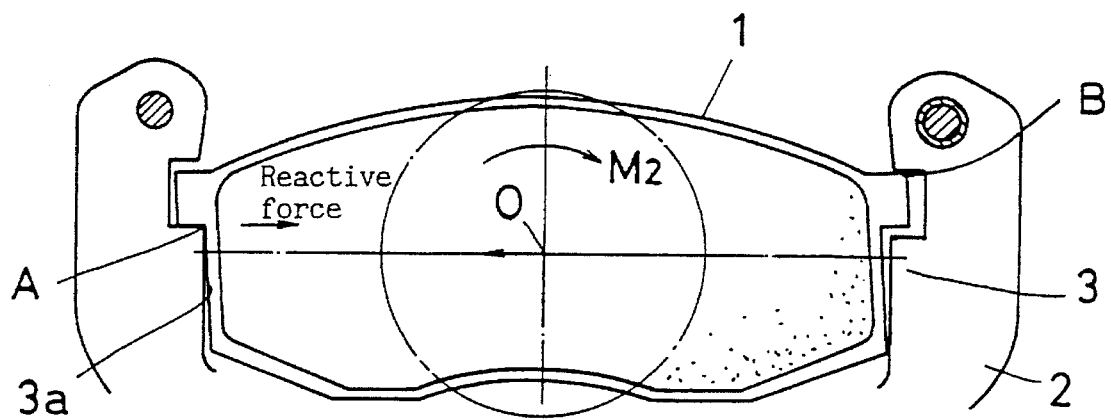
FIG. 3B is a view showing angular moment in a reverse direction which is produced in a conventional disc brake under reaction force.

In the arrangement shown in FIG. 2, the liners 11 are mounted in such a way that the pads 1 are always kept in the position they assume during braking. Namely, the liner 11 at the leading side of the pads are mounted in the same way as those shown in FIG. 1A. The liner 11 at the trailing side of the pads are mounted oppositely to bias the pads radially inwardly of the disc. Thus, the pads 1 are always urged counterclockwise and kept in engagement with the torque member 2 at points A and B. With this arrangement, the pads 1 will never move when the brake is applied, so that it is possible to prevent vibrations of the pads that may be triggered by the movement of the pads when the brake is applied. Also, since the movement of the pads is positively restrained by the liners 11, it is possible to eliminate rattling sounds while the car is moving, as well as its clonking sounds when the brake is applied.

The guide grooves 9 formed in the torque-carrying surfaces of the guide portions 3 may be replaced with protrusions which are engaged in recesses formed in backing plates of the pads.

As described above, according to the present invention, the movement of the pads are securely restrained during braking. As a result, the vibration of the pads decreases, so that self-excited vibrations of the pads and the rotor decrease. This leads to reduced squeaks of the brake.

Since the pads are always retained in the position where they are supposed to be restrained during braking by biasing the pads with the resilient arms of the liners, it is possible to prevent movement of the pads at the beginning of braking, so that squeaks can be attenuated more effectively.

Any conventional disc brake can be converted to the disc brake according to the present invention simply by changing the position of the torque-carrying portion. There is no need to add any extra elements. Thus, it is possible to manufacture disc brakes having improved characteristics at low cost.

What is claimed is:

1. A brake for engaging a disc comprising:

a pair of brake pads for engaging opposing sides of a disc;

a backing plate provided on each of said pads;

a torque member having pad guide portions in operative engagement with said pads to allow axial sliding movement and to restrain rotary movement of said pads;

a caliper;

a brake cylinder having a center and being integrally connected to said caliper;

a piston mounted in said brake cylinder;

a first liner, located at a trailing side of each of said pads and positioned between said backing plate of each of said pads and said guide portion of said torque member, each of said first liners having a resilient arm biasing said trailing sides of said pads radially inwardly relative to a disc; and a second liner, located at a leading side of each of said pads and positioned between said backing plate of each of said pads and said guide portion of said torque member, each of said second liners having a resilient arm biasing said leading sides of said pads radially outwardly relative to a disc.

2. A brake comprising:

a brake disc;

a pair of brake pads positioned on opposite sides of said disc;

a backing plate provided on each of said pads;

a torque member having pad guide portions in operative engagement with said pads to allow axial sliding movement and to restrain rotary movement of said pads;

a caliper;

a brake cylinder having a center and being integrally connected to said caliper;

a piston mounted in said brake cylinder;

a first liner, located at a trailing side of each of said pads and positioned between said backing plate of each of said pads and said guide portion of said torque member, each of said first liners having a resilient arm biasing said trailing sides of said pads radially inwardly relative to said disc; and a second liner, located at a leading side of each of said pads and positioned between said backing plate of each of said pads and said guide portion of said torque member, each of said second liners having a resilient arm biasing said leading sides of said pads radially outwardly relative to said disc.

3. The brake as claimed in claim 2, wherein one of said guide portions defines a point at which a braking force transmitted from said pads is counteracted, said point being located between a first line and a second line, wherein the first line passes through the center of said brake cylinder and is tangent to a circle concentric with said disc, and the second line passes through the center of said brake disc and is parallel to the first line.

4. The brake as claimed in claim 2, wherein said first and said second brake liners act on said pads to produce a moment in the same direction as the rotation of said disc.

* * * * *